United States Patent Office 2,770,571
Patented Nov. 13, 1956

2,770,571

SOFT GELATIN CAPSULE PROVIDED WITH INTERNAL BARRIER

John James Vance, Park Ridge, N. J., and Ernest Chu Yen, Pearl River, N. Y., assignors to American Cyanamid Company, New York, N. Y., a corporation of Maine No Drawing. Application August 17, 1953, Serial No. 374,830

1 Claim. (Cl. 167—83)

This invention relates to an improved gelatin capsule in which the gelatin film forming the capsule is protected from the capsule contents by a coating of a beta pinene polymer on the inside surface of the gelatin film.

Soft gelatin capsules are normally formed by casting a gelatin composition consisting of gelatin, water and glycerin, together with dyes, pigments, flavors, etc., in a continuous strip. The continuous strip of gelatin composition film is fed to encapsulating machines which form and fill capsules therefrom. The filling may be a powder or an oil, or both, etc. Unfortunately, in some instances, the capsule contents interact with the composition forming the film in such a manner that either the film or the contents are deleteriously affected. In the past it has been the custom to coat the surface of the gelatin film which is to form the interior of the capsule with a comparatively thick layer of material, such as shellac, as shown in Patent 2,196,283 to Zick and Riel, or to coat the capsules with benzoin, etc., as shown in the patent to Horigan, 1,683,466.

Unfortunately, such coatings do not consistently protect the capsule from the effect of the contents and, furthermore, comparatively thick coatings are required. For example, the Zick et al. patent specifies coating from .002 to .004 inch thick of shellac.

Capsules containing discreet particles of potassium iodide, for example, tend to form leakers. At areas where crystals of potassium iodide are in contact with shellac or gum benzoin coated-capsules, the gelatin film ruptures. Vitamin-mineral supplement capsules usually contain potassium iodide, 0.5 milligram being a standard quantity for an individual capsule. In production it was found that a group of capsules containing this quantity of potassium iodide, the interior surface of which capsules were coated with either shellac or gum benzoin, showed approximately 25% defective capsules because of the interaction between potassium iodide and the gelatin of the film through the shellac or gum benzoin coating. An interior coating of beta pinene resin which is formed by polymerizing beta pinene at relatively low temperatures in the presence of a catalyst and an aliphatic solvent will prevent this undesired interaction. Such a polymer is available from the Pennsylvania Industrial Corporation, Clairton, Pennsylvania, under the trade-name of Piccolyte S–115. This particular resin has a melting point by the ring and ball method of 115° C. Beta pinene resins of this type which have been polymerized to a lower or a higher melting point may be used, but the beta pinene polymer melting at about 115° C. is particularly useful.

This resin is very soluble in chloroform. When coating solutions of shellac or gum benzoin are used, the suspensions must be filtered or permitted to settle before using. The beta pinene resins are completely soluble with no residue in chloroform, may be used without filtration, and are fluid enough to be conveniently handled in concentrations as high as 30 grams solids per 100 milliliters. The polymer is very economical and is readily available and easy to handle. It is non-toxic, having been used as an ingredient in chewing gum and in packaging of foodstuffs for a long time.

The beta pinene polymer is dissolved in an inert, volatile, organic polymer solvent, such as chloroform, kerosene, petroleum ether, benzene or carbon tetrachloride. Chloroform is particularly useful as it is volatile, is non-explosive and is well accepted in pharmaceutical practice. The volatility is important as it is desirable that the solvent evaporate at room temperature during the comparatively short period between its application to the gelatin film and the time of capsule formation from the polymer coated gelatin film. The polymer solution may be applied by a coating roller. A partially submerged roller is permitted to rotate in a solution of the polymer, and the solution is transferred from the partially submerged roller to the gelatin film by one or more transfer rollers in accordance with standard coating procedures. A concentration of approximately 20 grams per 100 milliliters of the polymer in the chloroform solution gives a preferred result. A concentration of from 10 to 50% w./v. gives satisfactory results, and permits a variation in coating thickness which permits, to some extent, controlling the rate of decomposition and release of the capsule contents. The polymer film forms a continuous, inert, smooth film, which protects the gelatin film of the capsule shell from the shell contents to a far better extent than much thicker layers of shellac or gum benzoin. A coating of a .00036 inch thickness of the beta pinene polymer completely protected the gelatin film from deleterious effects of 0.5 milligram of potassium iodide per capsule of a vitamin-mineral composition.

A thickness of from .00005 to .0005 inch of the polymer is sufficient to protect the gelatin film and is so thin that it does not unduly delay the absorption of the capsule contents.

The polymerized beta pinene resin also gives superior results in the manufacture of oil-filled capsules and far fewer leakers result than with coatings such as shellac or gum benzoin. Furthermore, the coating of the beta pinene polymer prevents discoloration of the gelatin film by the capsule contents better than either shellac or gum benzoin coatings.

For some reason, the coating of the beta pinene polymer on the gelatin film improves the sealing characteristics of the gelatin films so that the encapsulating machines are easier to adjust, and give fewer defective capsules with both powder and liquid filled capsules.

The beta pinene polymer coating adheres to the gelatin film, and does not stick to and build upon belts, rollers, die rolls, and other parts of the encapsulating machine as much as shellac or gum benzoin coatings, so that maintenance and cleaning of the machine is simplified, as compared with shellac or gum benzoin coatings.

Another problem in capsule manufacture is that of detecting counterfeit capsules or preventing "passing off." A non-toxic, oil-soluble dye or other tracer material may be dissolved in the beta pinene polymer solution so that the interior coating not only serves to protect the capsule contents, but also serves as identification as to origin of the capsules. The dye may be one which has a distinctive color or may be one which has a distinctive fluorescence or other characteristics under ultra-violet light or other lighting conditions. A tracer which may be identified by chemical tests may be used instead of a dye, and because of the area in which it may be located in the finished capsule, extremely small quantities of the tracer may be used for positive identification of the capsules.

In the manufacture of long oval capsules, approximately 1" long, one liter of a 30% w./v. solution of the beta pinene polymer sufficed for the coating of 100,000 capsules. This corresponds to an interior coating thickness of approximately .00036 inch.

It will be obvious that the thickness of the coating may be varied somewhat, and different concentrations used under various operating conditions. Two thin coatings, instead of one thicker coating, could be used and a patterned coating could be used with a dye-stuff to give a characteristic pattern to colored areas for identification.

The capsules coated in the interior with the beta pinene polymer gives superior storage characteristics and are particularly satisfactory capsules.

Having thus disclosed our invention we hereby claim:

A soft gelatin capsule comprising a gelatin composition film and on the inner surface thereof a smooth continuous inert coating of a beta pinene polymer from about .00005 to .0005 inch thick, whereby the gelatin composition is protected from deleterious interaction with the capsule contents.

References Cited in the file of this patent

UNITED STATES PATENTS

| | | |
|---|---|---|
| 1,683,466 | Horigan | Sept. 4, 1928 |
| 2,196,283 | Zick | Apr. 9, 1940 |
| 2,320,717 | Corkery | June 1, 1943 |
| 2,357,811 | Corkery | Sept. 12, 1944 |
| 2,526,683 | Murphy | Oct. 24, 1950 |

OTHER REFERENCES

Chemical and Engineering News, vol. 26, Nov. 15, 1948, page 3445. (Copy in Sci. Libr.)